United States Patent
Brigham et al.

(10) Patent No.: US 7,412,310 B2
(45) Date of Patent: *Aug. 12, 2008

(54) SYSTEM AND METHOD FOR CONTROLLING ACTIVATION OF A POWER SOURCE OF A HYBRID ELECTRIC VEHICLE

(75) Inventors: David Brigham, Ann Arbor, MI (US); Brandon Masterson, Whitmore Lake, MI (US); Mark Yamazaki, Canton, MI (US); Kathleen Bailey, Dearborn, MI (US)

(73) Assignee: Ford Motor Company, Dearborn, MI (US)

( * ) Notice: Subject to any disclaimer, the term of this patent is extended or adjusted under 35 U.S.C. 154(b) by 455 days.

This patent is subject to a terminal disclaimer.

(21) Appl. No.: 11/161,409

(22) Filed: Aug. 2, 2005

(65) Prior Publication Data

US 2005/0273225 A1 Dec. 8, 2005

Related U.S. Application Data

(63) Continuation-in-part of application No. 10/605,136, filed on Sep. 10, 2003, now Pat. No. 6,941,198.

(51) Int. Cl.
*B05F 17/00* (2006.01)
*B60K 6/04* (2006.01)

(52) U.S. Cl. ........................ 701/22; 180/65.2

(58) Field of Classification Search ............... None
See application file for complete search history.

(56) References Cited

U.S. PATENT DOCUMENTS

| | | | |
|---|---|---|---|
| 4,405,029 | A | 9/1983 | Hunt |
| 5,820,172 | A | 10/1998 | Brigham et al. |
| 5,934,395 | A | 8/1999 | Koide et al. |
| 6,059,064 | A | 5/2000 | Nagano et al. |
| 6,176,807 | B1 | 1/2001 | Oba et al. |
| 6,307,277 | B1 | 10/2001 | Tamai et al. |
| 6,518,732 | B2 | 2/2003 | Palanisamy |
| 6,672,415 | B1 | 1/2004 | Tabata |
| 6,701,229 | B2 | 3/2004 | Iwasaki |
| 6,722,457 | B2 | 4/2004 | Yamaguchi et al. |
| 6,763,903 | B2 | 7/2004 | Morimoto et al. |
| 7,041,030 | B2 * | 5/2006 | Kuroda et al. ............. 477/21 |
| 2002/0079147 | A1 * | 6/2002 | Yamaguchi et al. ....... 180/65.2 |
| 2003/0006076 | A1 | 1/2003 | Tamor |
| 2003/0034653 | A1 | 2/2003 | Kitajima et al. |

* cited by examiner

*Primary Examiner*—Michael J. Zanelli
(74) *Attorney, Agent, or Firm*—David B. Kelley; Brooks Kushman P.C.

(57) ABSTRACT

A system and method of controlling activation of a power source of a hybrid electric vehicle. The method includes determining a vehicle speed, determining an operating state of a brake system, and controlling activation of the power source based on at least one of the vehicle speed and the operating state of the brake system.

19 Claims, 3 Drawing Sheets

SYSTEM AND METHOD FOR CONTROLLING ACTIVATION OF A POWER SOURCE OF A HYBRID ELECTRIC VEHICLE

CROSS-REFERENCE TO RELATED APPLICATIONS

This application is a continuation-in-part of U.S. application Ser. No. 10/605,136, now U.S. Pat. No. 6,941,198, filed Sep. 10, 2003.

BACKGROUND OF THE INVENTION

1. Field of the Invention

The present invention relates generally to the control of a hybrid electric vehicle, and more particularly to a method for controlling activation of a power source of a hybrid electric vehicle.

2. Background Art

Hybrid electric vehicles have been proposed that turn off an engine and use battery power to propel the vehicle at low speeds (e.g., less than 5 mph or from a complete stop). These vehicles emphasize the importance of not operating the engine at low speeds to conserve fuel. However, such vehicles may have insufficient electrical power or motor torque to simultaneously propel the vehicle and start the engine. As a result, there may be delayed engine starts, sluggish vehicle acceleration, and rapid depletion of battery charge. The use of higher capacity batteries to address these issues is undesirable due to increased cost, size, and/or weight.

SUMMARY OF THE INVENTION

In at least one embodiment of the present invention, a method of controlling activation of a power source of a hybrid electric vehicle is provided. The hybrid electric vehicle includes primary and secondary power sources and a brake system. The method comprises determining a vehicle speed, determining an operating state of the brake system, and activating or deactivating the primary power source. The primary power source is activated when (1) the vehicle speed is less than a first threshold value and the brake system is in a released condition, (2) the vehicle speed exceeds a second threshold value, or (3) a third threshold value has been exceeded. The primary power source is deactivated when the vehicle speed is less than the first threshold value and the brake system is not in the released condition.

In at least one other embodiment of the present invention, a system for controlling activation of a power source of a hybrid electric vehicle is provided. The system comprises primary and secondary power sources, a brake system for braking a vehicle wheel, a brake signal, an acceleration request signal, a vehicle speed signal, and a wheel drive signal indicative of at least one of a target torque value and a target power value. The primary power source is activated when (1) the vehicle speed signal is less than a first threshold value and the brake signal indicates that brake actuation is not requested, or (2) the vehicle speed signal exceeds a second threshold value, or (3) the acceleration request signal is indicative of a vehicle acceleration request and the wheel drive signal exceeds a torque threshold value and/or a power threshold value. The primary power source is deactivated when the vehicle speed signal is less than the first threshold value and the brake signal indicates that brake actuation is requested.

DETAILED DESCRIPTION

Detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for the claims and/or as a representative basis for teaching one skilled in the art to variously employ the present invention.

Figure 1:
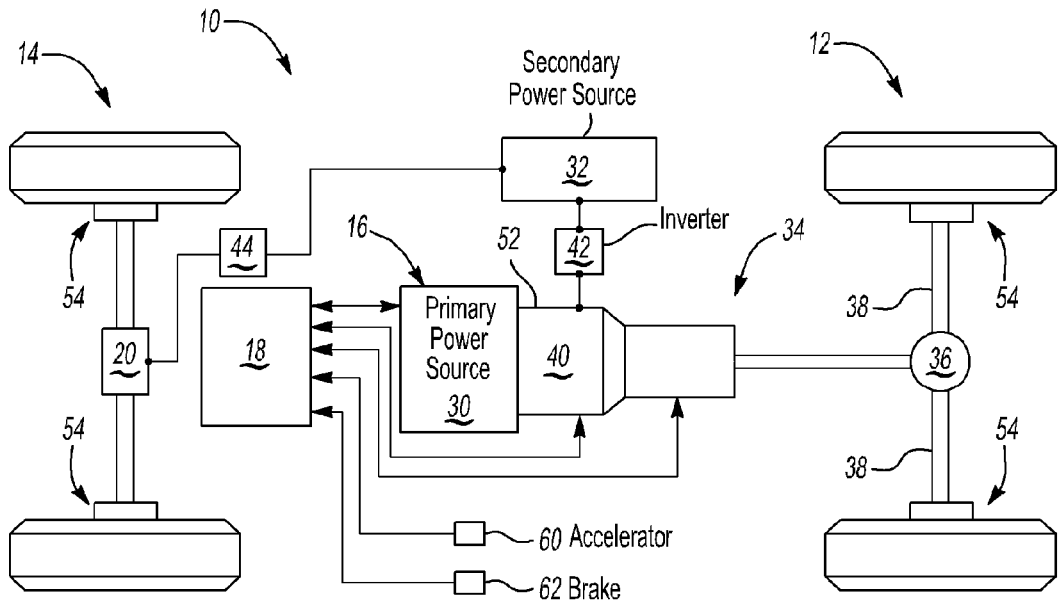
FIG. 1 is a schematic of a first embodiment of a hybrid electric vehicle.

Referring to FIG. 1, a schematic of a hybrid electric vehicle 10 is shown. The hybrid electric vehicle 10 may include a first wheel set 12, a second wheel set 14, a wheel drive system or powertrain 16, and a control system 18.

The powertrain 16 may be configured to drive or provide torque to the first and/or second wheel sets 12,14. In the embodiment shown, the first wheel set 12 is configured to be driven by the powertrain 16 while the second wheel set 14 is adapted to be driven by an electrical machine 20, such as an electric motor. Alternatively, the second wheel set 14 may be provided without an electrical machine 20 in other embodiments of the present invention.

The hybrid electric vehicle 10 may include any suitable number of power sources. In the embodiment shown in FIG. 1, the hybrid electric vehicle 10 includes a primary power source 30 and a secondary power source 32.

The primary power source 30 may be any suitable energy generation device, such as a fuel cell, hydraulic power source, internal combustion engine adapted to combust any suitable type of fuel like gasoline, diesel fuel, or hydrogen, or mechanical power source such as an engine, flywheel, spring, or compressed gases.

The secondary power source 32 may be any suitable source of electrical energy. For example, an electrical power source such as a battery, a battery pack having a plurality of electrically interconnected cells, capacitor, or a fuel cell may be utilized. If a battery is used it may be of any suitable type, such as nickel-metal hydride (Ni-MH), nickel-iron (Ni—Fe), nickel-cadmium (Ni—Cd), lead acid, zinc bromine (Zn—Br), or lithium based. If a capacitor is used it may be of any suitable type, such as an ultra capacitor, super capacitor, electrochemical capacitor, or electronic double layer capacitor as is known by those skilled in the art. Alternatively, the secondary power source 32 may include one or more non-electrical devices whose energy may be converted to electrical energy. For instance, a hydraulic power source or mechanical power source such as a flywheel, spring, engine, or compressed gases may be used to power an electrical machine, such as a motor, to provide electrical energy. For simplicity, the description below will primarily refer to an embodiment of the present invention that incorporates an electrical power source as the secondary power source.

The primary and/or secondary power sources 30,32 may be adapted to provide power to a power transfer system 34 and/or electrical machine 20.

The power transfer system 34 may be adapted to drive one or more vehicle wheels. In at least one embodiment, the power transfer system 34 may be connected to a differential 36 in any suitable manner, such as with a driveshaft, chain, or other mechanical linkage. The differential 36 may be connected to each wheel of the second wheel set 14 by one or more shafts 38, such as an axle or halfshaft.

The power transfer system 34 may have any suitable configuration. For instance, the power transfer system 34 may be configured with a parallel drive, series drive, split parallel drive, modular hybrid transmission, or powersplit transmission.

The power transfer system 34 may include an electrical machine 40, such as a motor, motor-generator, starter-alternator, or integrated starter-generator as is known by those skilled in the art. The electrical machine 40 may be adapted to be driven by the primary power source 30 and/or the secondary power source 32. For example, the primary power source 30 may be selectively coupled to the electrical machine 40 in any suitable manner, such as with a one way clutch, to drive the power transfer system 34. The secondary power source 32 may be connected to the electrical machine 40 via an inverter 42. The inverter 42 converts direct current to alternating current when energy is flowing from the secondary power source 32 and converts alternating current to direct current when energy is flowing to the secondary power source 32.

The exemplary hybrid electric vehicle configurations shown in FIGS. 1-3 will now be described in more detail. For convenience, similar or comparable components are identified with common reference numbers.

In FIG. 1, the primary power source 30 is configured to drive the first wheel set 12 while the secondary power source 32 is configured to provide electrical energy to the electrical machine 20 via an inverter 44 to power the second wheel set 14.

Figure 2:
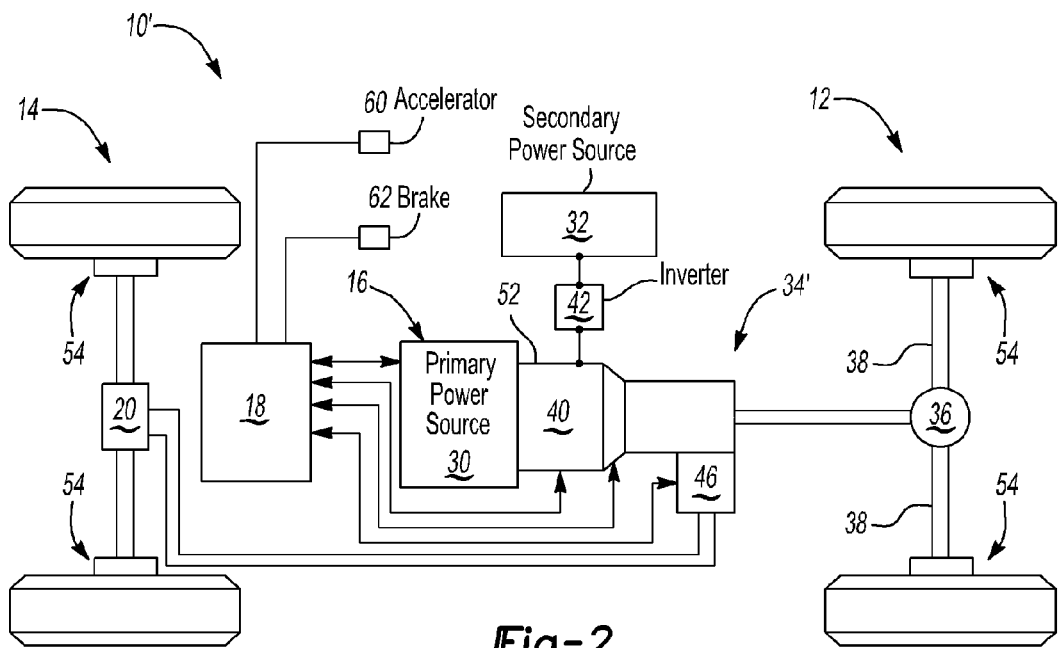
FIG. 2 is a schematic of a second embodiment of a hybrid electric vehicle.

In FIG. 2, a hybrid electric vehicle 10' is shown in which the primary or secondary power sources 30,32 are configured to provide power to the power transfer system 40. The power transfer system 34' is configured to provide power to drive the first and/or second wheel sets 12,14. More specifically, the power transfer system 34' may be connected to the first wheel set 12 as previously described. In addition, the power transfer system 34' may be mechanically connected to the electrical machine 20 in any suitable manner to power the electrical machine 20. For example, an intermediate power transfer unit 46 may be provided that couples the power transfer system 34' to the electrical machine 20. Alternatively, the intermediate power transfer unit 46 may be coupled to another electrical machine, such as a motor or motor-generator, to create electrical energy for powering the electrical machine 20 and/or other electrical components.

Figure 3:
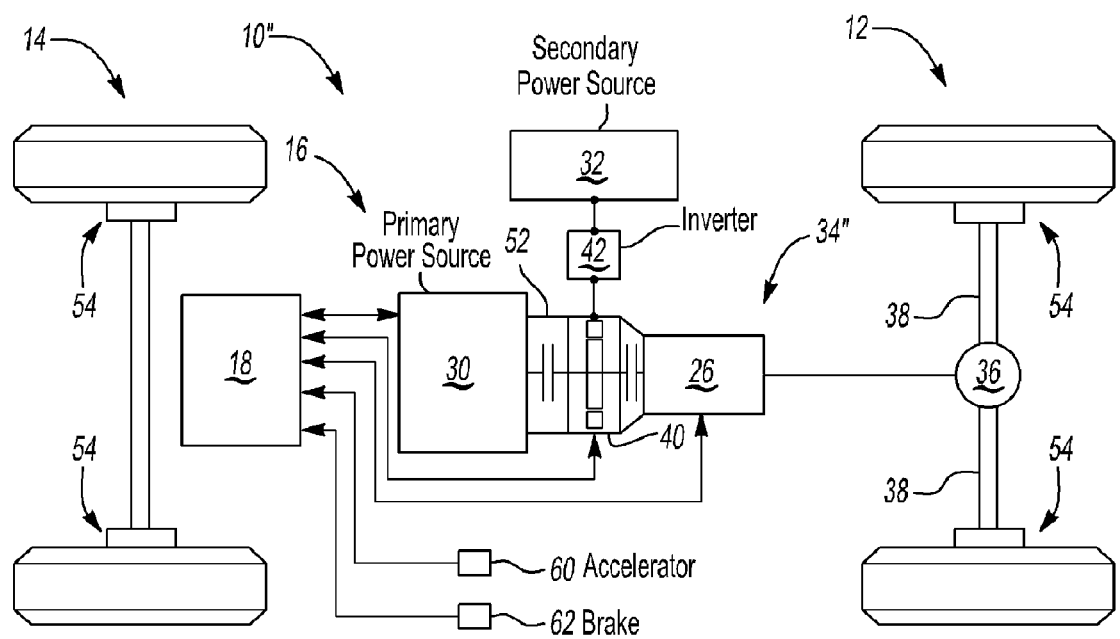
FIG. 3 is a schematic of a third embodiment of a hybrid electric vehicle.

In FIG. 3, a hybrid electric vehicle 10" is shown in which the primary and/or secondary power sources 30,32 are configured to provide power to a power transfer system 34". The power transfer system 34" is configured to provide power to drive the first wheel set 12. More specifically, the primary power source 30 is connected to an electrical machine 40, such as a motor or starter/alternator, via a first clutch 52. The primary power source 30 may propel the vehicle when the first clutch 52 is engaged, and the secondary power source 32 may propel the vehicle 10" using the electrical machine 40 when the first clutch 52 is disengaged.

The hybrid electric vehicles previously described may also be configured with a brake system 54 for inhibiting rotation of one or more vehicle wheels. In addition, hybrid electric vehicles may be provided with one or more energy recovery devices, such as a regenerative braking system that captures kinetic energy when one or more brakes are applied and returns the recovered energy to a power source.

The control system 18 may monitor and/or control various aspects of the hybrid electric vehicle 10. For example, the control system 18 may be connected to the primary power source 30, secondary power source 32, and/or power transfer system 34,34',34" to monitor and control their operation and performance. The control system 18 may have any suitable configuration. For example, the control system 18 may include one or more controllers or control systems.

The control system 18 may also receive signals from various components. For example, the control system may receive an acceleration request signal indicative of vehicle acceleration demanded by the driver, a brake signal indicative of braking demanded by the driver, and a vehicle speed signal indicative of the vehicle speed. The acceleration request signal may be provided in any suitable manner, such as from an accelerator request sensor 60 associated with an accelerator pedal or similar input device. Similarly, the brake signal may be provided by the brake system 54 in any suitable manner, such as with a brake sensor 62 associated with a brake pedal or similar input device or by monitoring a portion of the brake system for an associated response, such as a change in hydraulic pressure. The speed signal may also be provided in any suitable manner, such as with a speed sensor that detects the rotational velocity of a vehicle wheel, axle, or a component of the power transfer system, such as an input shaft, output shaft, or intermediate shaft or other rotational component disposed between the input and output shafts.

Figure 4:
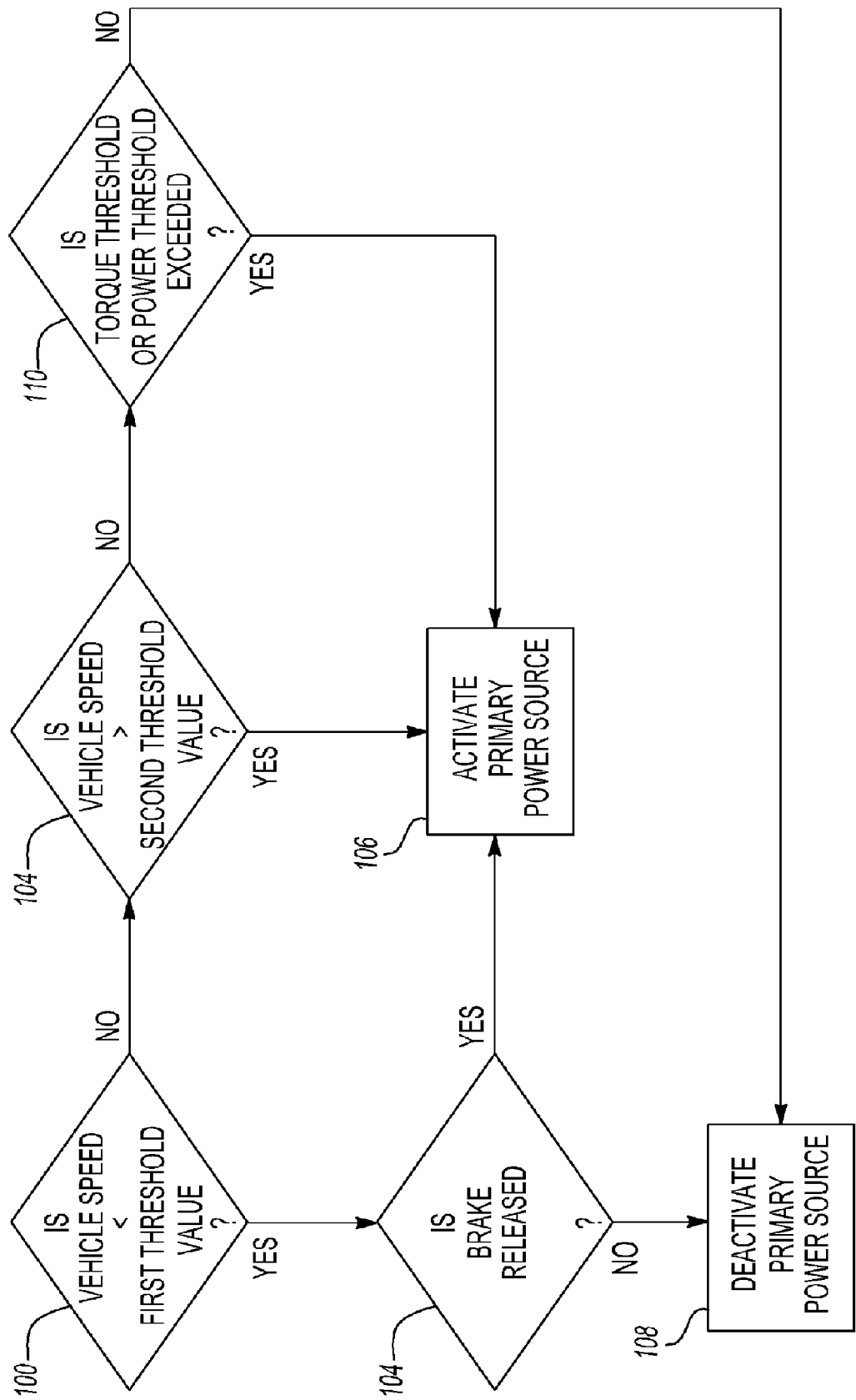
FIG. 4 is a flowchart of a method for controlling activation of a power source of a hybrid electric vehicle.

Referring to FIG. 4, a flowchart of a method for controlling the activation of a power source of a hybrid electric vehicle is shown. As will be appreciated by one of ordinary skill in the art, the flowcharts represent control logic which may be implemented using hardware, software, or combination of hardware and software. For example, the various functions may be performed using a programmed microprocessor. The control logic may be implemented using any of a number of known programming or processing techniques or strategies and is not limited to the order or sequence illustrated. For instance, interrupt or event-driven processing is employed in real-time control applications, rather than a purely sequential strategy as illustrated. Likewise, pair processing, multitasking, or multi-threaded systems and methods may be used to accomplish the objectives, features, and advantages of the present invention.

This invention is independent of the particular programming language, operating system processor, or circuitry used to develop and/or implement the control logic illustrated. Likewise, depending upon the particular programming language and processing strategy, various functions may be performed in the sequence illustrated at substantially the same time or in a different sequence while accomplishing the features and advantages of the present invention. The illustrated functions may be modified or in some cases omitted without departing from the spirit or scope of the present invention.

At 100, the method begins by comparing the vehicle speed to a first threshold value. The vehicle speed may be based on the vehicle speed signal as previously described. The first threshold value denotes the speed below which it may not be desirable to start the primary power source to help conserve fuel. The first threshold value may be a constant having any suitable value, such as 5 mph. Alternatively, the first threshold value may be a variable based on vehicle performance characteristics. For instance, the first threshold value may be based on a driving mode selected by the driver. These modes may include a fuel economy mode, performance mode, on-road mode, off-road mode, or may be adapted for different environmental and/or road conditions. If the vehicle speed is less than the first threshold value, then the method continues at block 102. If the vehicle speed is not less than the first threshold value, then the method continues at block 104.

At 102, the method assesses the status of the brake system. The status may be assessed in any suitable manner, such as by using the brake signal described above. If the brake system indicates braking is not desired (e.g., the brakes are in a released condition), then the method continues at block 106. If braking is desired (e.g., the brake system is not in a released condition), then the method continues at block 108 where the primary power source is deactivated or turned off.

At 104, the vehicle speed is compared to a second threshold value. The second threshold value denotes the speed above which operation or activation of the primary power source is desired. The second threshold value may be any suitable value that differs from the first threshold value. For instance, the second threshold value may be any suitable constant, such as 55 mph, and may prevent the engine from being shut off at high vehicle speeds. Alternatively, the second threshold value may be a variable based on vehicle performance characteristics as previously discussed. If the vehicle speed is greater than the second threshold value, then the method continues at block 106. If the vehicle speed is less than the second threshold value, then the method continues at block 110.

At 106, the primary power source is activated or turned on. The primary power source may be activated in any suitable manner as is known by those skilled in the art. For example, in an embodiment having a primary power source configured as an internal combustion engine, an electrical machine and/or vehicle inertia may be used to help start the or turn over the engine.

At 110, the method determines whether a third threshold value (torque threshold) and/or a fourth threshold value (power threshold) is exceeded. This determination may be based at least in part on the acceleration signal. More specifically, step determines whether additional power is demanded by the driver and whether an additional power demand warrants starting the primary power source. For convenience in reference, the term wheel drive signal indicative of at least one of a target torque value and a target power value in the claims below.

The decision to start the primary power source may be made in any suitable manner, such as by using data in one or more look-up tables stored in memory of the control system. The look-up table may contain output torque values associated with various acceleration signals or accelerator pedal positions and/or power transfer unit gear ratios.

Data in the look-up tables may be used in the following manner. First, the control system may receive a signal indicative of the current power transfer unit gear ratio. This signal may be used to select a look-up table associated with the current gear ratio. Next, the acceleration signal and vehicle speed may be used to reference a target output torque value in the look-up table. The target torque value may be multiplied by a speed value to obtain a target power value. The speed value may be provided in any suitable manner, such as with a speed sensor associated with the electrical machine 40. Next, the target torque value may be compared to a threshold torque value and/or the target power value may be compared to a threshold power value. If the target torque value is greater than the torque threshold value and/or if the target power value is greater than the threshold power value, then the primary power source is activated at block 106. If the target torque value and/or target power value is less than their associated threshold values, the primary power source is deactivated at 108.

The threshold torque and power values may be based on performance limitations of the electrical machine 40. In addition, the threshold power value may be based on energy management factors, such as the performance limitations of the secondary power source. For instance, if the secondary power source is a voltage source, the power threshold value may be based on its peak energy discharge capabilities.

An example of how the method may operate is summarized below. If the primary power source is on and the vehicle speed is greater than the second threshold value, then the primary power source will continue to run. If the driver releases the accelerator pedal, the vehicle will decelerate. When the vehicle speed falls below the second threshold value, the primary power source is turned off. The primary power source will restart if the accelerator pedal is actuated and the target torque value exceeds the torque threshold value and/or the target power value exceeds the power threshold value. If the vehicle speed drops below the first threshold value and the brake system is engaged, then the primary power source is turned off. The primary power source will start if the driver releases the brake pedal.

This strategy reduces the likelihood of a "torque deficit" where there is insufficient torque to accelerate the vehicle and/or start the primary power source. Specifically, the primary power source may be used to propel the vehicle at low speeds. Electric drive may be primarily used when the vehicle speed is greater than the first threshold value. At speeds above the first threshold value, there is sufficient torque available from an electrical machine and/or vehicle inertia to activate the primary power source without incurring an undesirable torque deficit.

While the best mode for carrying out the invention has been described in detail, those familiar with the art to which this invention relates will recognize various alternative designs and embodiments for practicing the invention as defined by the following claims.

What is claimed is:

1. A method of controlling activation of a power source of a hybrid electric vehicle having primary and secondary power sources and a brake system, the method comprising:
    determining a vehicle speed;
    determining an operating state of the brake system;
    activating the primary power source when (1) the vehicle speed is less than a first threshold value and the brake system is in a released condition, or (2) the vehicle speed exceeds a second threshold value, or (3) a third threshold value has been exceeded; and
    deactivating the primary power source when the vehicle speed value is less than the first threshold value and the brake system is not in the released condition.

2. The method of claim 1 wherein the third threshold value is exceeded when a target torque value exceeds a threshold torque value.

3. The method of claim 1 wherein the third threshold value is indicative of a torque limit of an electrical machine.

4. The method of claim 1 wherein the third threshold value is exceeded when a target power value exceeds a threshold power value.

5. The method of claim 1 wherein the third threshold value is indicative of a performance limitation of the secondary power source.

6. The method of claim 1 wherein the primary power source is deactivated when the vehicle speed is not less than the first threshold value and not greater than the second threshold value and the third threshold value is not exceeded.

7. The method of claim 1 wherein the first threshold value is less than the second threshold value.

8. The method of claim 1 wherein brake system is in a released condition when a brake sensor does not detect actuation of a brake pedal.

9. A system for controlling activation of a power source of a hybrid electric vehicle, the system comprising:
   primary and secondary power sources;
   a brake system for braking a vehicle wheel;
   a brake signal;
   an acceleration request signal;
   a vehicle speed signal;
   a wheel drive signal indicative of at least one of a target torque value and a target power value; and
   a control system that activates the primary power source when (1) the vehicle speed signal is less than a first threshold value and the brake signal indicates that brake actuation is not requested, or (2) the vehicle speed signal exceeds a second threshold value, or (3) the acceleration request signal is indicative of a vehicle acceleration request and the wheel drive signal exceeds a torque threshold value and/or a power threshold value; and
   the control system deactivates the primary power source when the vehicle speed signal is less than the first threshold value and the brake signal indicates that brake actuation is requested.

10. The system of claim 9 wherein the primary power source is an engine.

11. The system of claim 9 wherein the secondary power source is a voltage source.

12. The system of claim 9 wherein the primary and secondary power sources are adapted to selectively drive the vehicle wheel to propel the hybrid electric vehicle.

13. The system of claim 9 wherein the brake signal is provided by a brake pedal sensor.

14. The system of claim 9 wherein the acceleration signal is provided by an accelerator pedal sensor.

15. The system of claim 9 wherein the torque threshold value is based on the acceleration request signal and a selected gear ratio of a power transfer unit.

16. The system of claim 9 wherein the power threshold value is based on the acceleration request signal and a selected gear ratio of a power transfer unit.

17. The system of claim 9 wherein the target power value is based on the target torque value and the vehicle speed signal.

18. The system of claim 9 wherein the hybrid electric vehicle further comprises a first wheel set adapted to be driven by the primary and/or secondary power sources and a second wheel set adapted to be driven by the secondary power source.

19. The system of claim 9 wherein the hybrid electric vehicle further comprises a first wheel set adapted to be driven by a power transfer system powered by the primary and/or secondary power sources and a second wheel set having an electrical machine mechanically driven by the power transfer system.

* * * * *